United States Patent [19]

Blackhurst

[11] Patent Number: 5,012,852

[45] Date of Patent: May 7, 1991

[54] BARRIER ASSEMBLY

[76] Inventor: Michael L. Blackhurst, Main St., Antrim, N.H. 03440

[21] Appl. No.: 319,572

[22] Filed: Mar. 6, 1989

[51] Int. Cl.[5] .............................................. A47G 5/00
[52] U.S. Cl. .................................... 160/351; 160/371; 160/377
[58] Field of Search ............... 160/371, 377, 380, 351, 160/381, 402, 327, 368.1; 403/349, 348; 128/849, 846; 40/155

[56] References Cited

U.S. PATENT DOCUMENTS

| | | | |
|---|---|---|---|
| 354,976 | 12/1886 | Field. | |
| 376,881 | 1/1888 | Haish | 160/381 |
| 1,175,274 | 3/1917 | Klorer. | |
| 1,217,838 | 2/1917 | Schmidt. | |
| 1,378,904 | 5/1921 | Schuermann | 160/377 X |
| 1,527,998 | 3/1923 | Serpico. | |
| 1,580,903 | 4/1926 | Kelleher. | |
| 2,469,531 | 5/1949 | Toth | 82/34 |
| 2,525,063 | 10/1950 | Bowman | 197/181 |
| 2,628,803 | 2/1953 | Krewson | 248/124 |
| 2,641,427 | 6/1953 | Krogh | 248/497 X |
| 2,867,064 | 1/1959 | Hermansson | 51/272 |
| 3,575,407 | 4/1971 | Carson | 269/322 |
| 4,411,219 | 10/1983 | Keith | 118/505 |
| 4,543,021 | 9/1985 | Adler | 409/134 |
| 4,578,885 | 4/1986 | Dang et al. | 160/380 X |
| 4,863,181 | 9/1989 | Howle | 403/349 X |

Primary Examiner—Blair M. Johnson
Attorney, Agent, or Firm—Olive & Olive

[57] ABSTRACT

A barrier shield against exposure to environmental contaminants comprises a frame assembly for tensionally retaining a thin resilient film for protection of dental, medical and laboratory workers from sprayed or spattered debris and fluid from the work area, such as a patient's mouth or surgical site. The frame assembly is constructed and mounted so that it may be positionally adjusted by means of a flexible support.

6 Claims, 4 Drawing Sheets

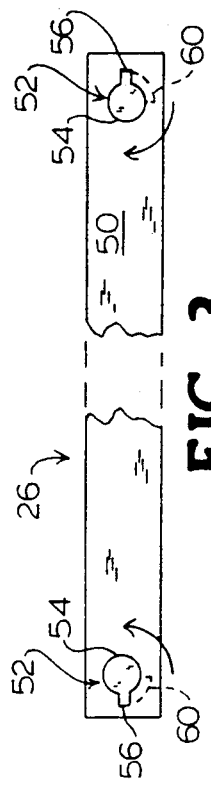
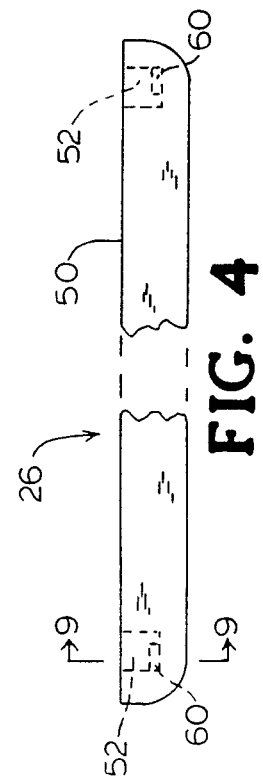
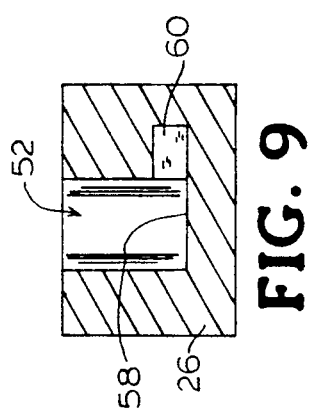
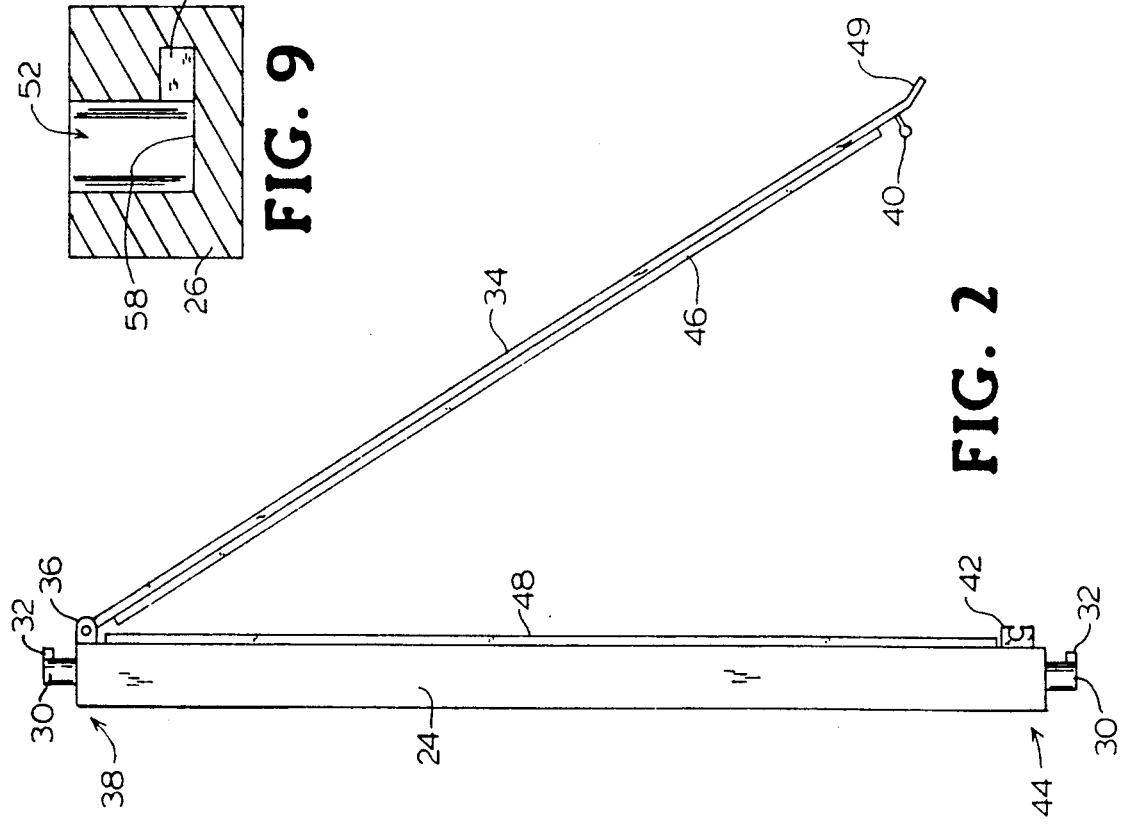

BARRIER ASSEMBLY

BACKGROUND OF THE INVENTION

1. Field of the Invention

This invention relates to devices to protect persons from exposure to environmental contaminants. More particularly, this invention pertains to a barrier-type device for preventing the spread of airborne contaminants in medical and dental treatment operations for protection of personnel against airborne debris and contaminants in medical, dental and laboratory operations.

2. Description of the Related Art

Bacteria and viruses may be transferred from patients to dentists in the debris that is ejected from the patient's mouth during dental care and surgery. This debris may contain blood, saliva, hard tissue and filling materials. In an attempt to avoid or decrease exposure of dental workers to possible pathogens, face and eye shield devices have been designed for the dentist to wear attached to the dentist's head (U.S. Pat. No. 4,701,965) or suspended around the dentist's neck (U.S. Pat. No. 4,701,129). These patents and all other references cited herein are incorporated by reference herein. Such face shield devices may become fogged or dirtied on the inside by the wearer or may be difficult to use by wearers with glasses. In addition, face shields may interfere with breathing due to lack of sufficient ventilation between the shield and the face.

In the medical profession as a whole, other types of shields to protect the medical workers or the patient from contamination and infection have been developed including plastic body wraps (U.S. Pat. No. 4,725,719), draping screens (U.S. Pat. No. 3,575,407) and laminar air flow hoods (U.S. Pat. No. 3,820,536).

Other industries also have need for shields to protect the worker from splashes or flying particles or debris or to protect the work surfaces. Protective devices include a variety of eye shields, and shields for the work area, such as a circular guard having a transparent material held in a frame, which may be mounted on metal working machines to protect the operator (U.S. Pat. No. 1,175,274), a U-shaped safety shield assembly (U.S. Pat. No. 4,043,701) and an eye and face shield for work with an emery wheel, comprising a transparent plate held in a frame, with a base that attaches by means of a flexible part to the table of a floor stand (U.S. Pat. No. 1,580,903).

In the construction industry, a paint guard for protecting frame windows or doors includes a rectangular framework with telescopingly interconnected frame members so that the size of the frame may be adjusted (U.S. Pat. No. 4,411,219). It has a biasing spring mechanism to hold the frame in a contracted position on a door or window. A flexible material may be held within this frame by rollers positioned at the edge of the frame.

Many of the barrier guards that are positioned near a work area to protect the worker must be regularly cleaned, especially if the debris is wet or sticks to the surface of the guard. Not only is such a cleaning procedure time-consuming, but in medical applications, he cleaning procedure may expose the person cleaning the apparatus to any contaminating organisms present on the shield. These shields may also scratch, resulting in decreased transparency. In addition, these guards may be difficult to disinfect and sterilize by design, or because their size precludes sterilization by small office autoclaves. Guards are often difficult to place in the exact desired position due to structural limitations of the guards themselves or of their support structures. Many guards comprise glass or other heavy or breakable material that increases the difficulty of easy maneuverability of the guard. Most of these devices do not comprise frames that are capable of use with transparent lightweight film material or that can hold such a material taut and smooth. In dental work, because the operator works at a wide variety of positions with respect to the patient, the position of a shield designed for dental use needs to be easily adjustable for effective use of the shield.

It is therefore an object of this invention to provide a positionally adjustable barrier assembly for dental, medical and laboratory workers. The invention is useful for worker protection in situations as varied as dental and medical offices, hospital microbiology and blood labs, industrial and educational chemistry labs and factories that employ rotary instruments.

It is a further object of this invention to provide a barrier assembly having a transparent film shield which may be inexpensively and quickly replaced It is a further object of this invention to provide a barrier assembly that holds transparent film smoothly in place.

It is a further object of this invention to provide a barrier assembly that is sterilizable.

Other objects and advantages will be more fully apparent from the following disclosure and appended claims.

SUMMARY OF THE INVENTION

This invention generally comprises a barrier shield against exposure to environmental contaminants. In particular, the invention comprises a frame assembly for tensionally retaining a thin resilient film for protection of dental, medical and other workers from sprayed or spattered debris from the work area, such as a patient's mouth, a surgical site or a laboratory counter. The frame assembly is constructed and mounted so that it may be positionally adjusted by means of a flexible support.

The essence of the invention is a frame assembly for use as a barrier shield by tensionally retaining a thin, flexible, resilient film, said frame assembly comprising:
(a) a frame;
(b) a means to hold the film on the frame; and
(c) a support structure for the frame, said support structure being positionally adjustable.

In one preferred embodiment, the frame for tensionally retaining a thin, flexible, resilient film, comprises:
(a) opposedly positionable frame side members, each having axially extending protrusions at respective ends thereof, each said protrusion having a radially extending projection at its extremity, each said side member further including a longitudinally extending retention strip which is hingedly attached to said frame member at a first extremity thereof so as to be hingedly swingable to an open position, with closure means at a second end of the strip, and a complementary closure element on each said frame side member lockingly matable with the strip closure means; and
(b) opposedly positionable top and bottom frame members, each having openings at its respective ends for mating engagement with the protrusions of respective frame side members, such openings being configured so that the radial projections frame side members are secured against vertical movement by engagement of corresponding laterally extending passages in the openings, and when so engaged the longitudinally extending retention strip is frontally disposed on the frame.

The frame side, top and bottom members may be formed of a steam-sterilizable and autoclavable material of construction. A flexible, resilient polymeric film is tensionally retained on the frame by the longitudinally extending retention elements and the film is preferably a cling-type film.

In another preferred embodiment, the frame comprises a quadrilateral frame comprising opposedly positioned top and bottom frame members, and side frame members, the top and bottom frame members having openings at respective extremities thereof, and the side frame members having protrusions at extremities thereof which are constructed and shaped to engage the openings at the top and bottom frame member extremities; and the support structure comprises a base; and a flexible and adjustably positionable support structure coupled at one end thereof to the base and secured at the other thereof to the bottom frame member, such that the frame is manually positionable in a selected position relative to the base.

The frame assembly preferably further comprises a sheet of a flexible, resilient polymeric, cling-type film of a size corresponding to the frame, the film being clingingly retained under tension on the frame solely by adherence of the film to the frame members and/or by being self-adheringly, overlappingly wrapped about the associated frame members.

In another preferred embodiment the frame assembly for providing a barrier shield against environmental contaminants comprises:

(a) a frame mounting a flexible, resilient polymeric film;
(b) a flexible, non-extensible, goose neck-type support, joined at a first end to the frame;
(c) a rigid first tubular section, joined at a first end thereof to a second end of said goose neck-type support;
(d) a rigid tubular second section telescopingly engageable at a first end thereof with the first tubular section;
(e) a base joined to a second end of said second tubular section; and
(f) means for adjustably securing said first and second telescopingly engaged tubular sections in a selected fixed position relative to one another, whereby the height of the frame ma be selectively adjusted.

Other aspects and features of the invention will be more fully apparent from the following disclosure and appended claims.

BRIEF DESCRIPTION OF THE DRAWINGS

FIG. 2 is a side view of a side piece of the frame of the invention that holds the transparent shield.

FIG. 3 is an inside edge of a top or bottom piece of the frame of the invention.

FIG. 4 is a side view of a top or bottom piece of the frame of the invention.

FIG. 9 is a view in section on a line corresponding to line 9—9 of FIG. 4, showing the opening in the end of the bottom piece of the invention.

DETAILED DESCRIPTION OF THE INVENTION AND PREFERRED EMBODIMENTS THEREOF

Figure 1:
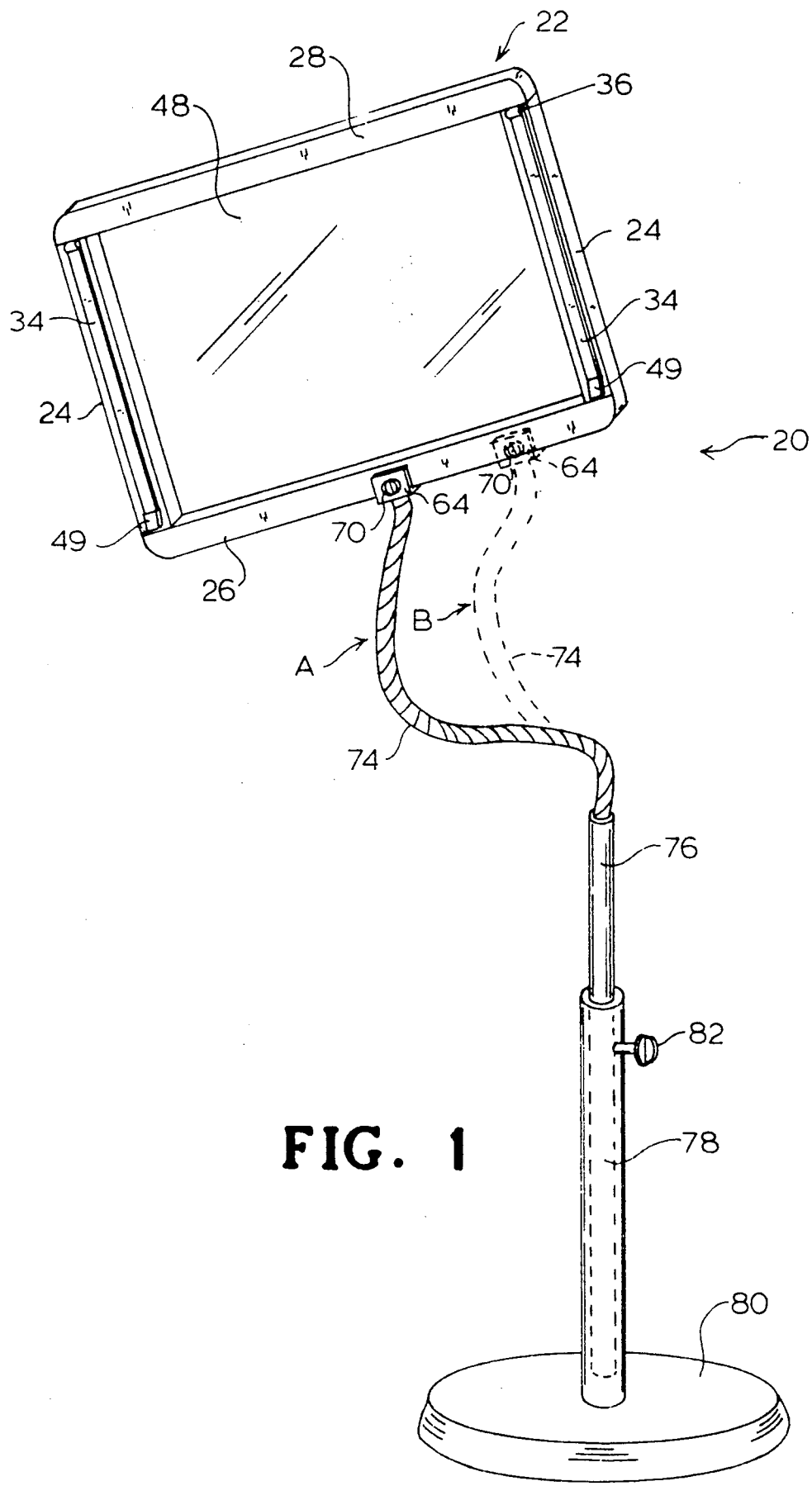
FIG. 1 is a perspective view of the frame assembly of the invention for holding the transparent shield.

The present invention comprises a frame assembly 20 for use as a barrier shield against exposure to environmental contaminants. As shown in FIG. 1, the frame assembly 20 comprises a frame 22 having two side pieces 24, a bottom piece 26 and a top piece 28. These pieces may be made of such materials as metal, plastic or other sturdy material. The size of this frame 22 is preferably about 12 inches by 11 inches; however, it may made any size that may be appropriate for particular uses. The corners of the frame 22 are preferably rounded so there are not sharp corners to endanger the patient.

As shown in more detail in the side view of FIG. 2, the side pieces 24 preferably are each linear structures with rounded axially extending protrusions 30 at each end of each side piece 24. Each protrusion 30 has a radially extending projection 32 at its extremity. In the preferred embodiment, a separate hinged retention strip 34 is attached by a hinge 36 to the upper end 38 of each side piece 24 just below the upper axially extending protrusion 30. The hinged retention strip 34 has a closure means 40 at the end remote from the hinge 36 and there is a closure element 42, which is complementary to the closure means 40, located near the lower end 44 of the side piece 24. The hinged strip 34 extends linearly along the side piece 24 and may be laid flat against the side piece 24 so that the closure means 40 is mated lockingly with the closure element 42. As discussed in more detail below, a rubber or other frictional piece 46 may be added to the hinged retention strip 34 to more securely hold the transparent wrap 48 on the frame 22. In the preferred embodiment, the retention strip 34 is about 11½ inches long for holding the transparent wrap 48 and the side piece 24 is of as short a length as possible that will still hold the film. The preferred length of the bottom piece 26 and the top piece 28 is about 10 to 11 inches. An angled handle 49 or another type of handle is placed at the unhinged end of the hinged retention strip 34 to allow easy lifting of the hinged retention strip for removal and replacement of the transparent wrap 48.

Figure 5:
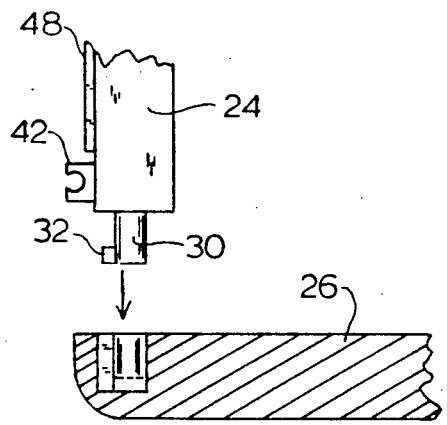
FIG. 5 is a front view of one end of the bottom of the frame showing how the end of the side piece is positioned prior to insertion into the end of the bottom piece.
Figure 6:
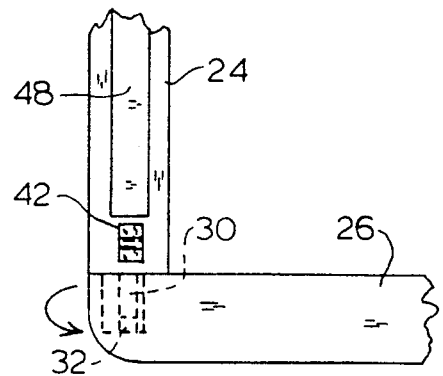
FIG. 6 is a front view of one end of the bottom of the frame showing the side piece after insertion of the end of the side piece and rotation of the end of the side piece i the hole at the end of the bottom piece.

The bottom piece 26 is identical to the top piece 28. In the following discussion of FIGS. 3 and 4, it should be understood that the top piece is handled in the same manner as the bottom piece. Referring now to FIG. 3 which is a top view of the bottom piece 26 the inside top side 50 of the bottom piece 26 has an opening 52 at each end for mating engagement with the axially extending protrusion 30 on the respective side piece 24. Each opening 52 comprises a rounded portion 54 having an outwardly protruding narrow concave bulge 56 extending toward the nearest end of the bottom piece 26. The opening 52 extends downward into the bottom piece 26 and at the base 58 of the hole, the narrow concave bulge 56 broadens to form a locking area 60 that extends from beneath the narrow bulge 56 toward one side of the bottom piece 26 as shown in cross section in FIG. 9. These openings 52 are configured so that the axially extending protrusion 30 at one end of the side piece 24 may be placed in one of the openings 52, the radial projection 32 at an end of the side piece 24 fitting into a narrow concave bulge 56. As shown in FIGS. 4–6, when the side piece 24 is positioned for insertion of the axially extending protrusion 30, the radial projection 32 on the side piece 24 extends toward the end of the bottom piece that is nearest the opening 52 into which the side piece is to be inserted. After insertion, the side piece 24 is rotated into position in the concave locking area 60 with the radial projection 32 extending toward the side of the bottom piece (toward the viewer, in FIG. 6). The direction of rotation of the side piece 24 on the left end of the bottom piece is counter-clockwise as viewed from the top of the bottom piece while the right end is rotated in a clockwise direction (see arrows in FIG. 3). The top end 38 of each side piece 24 is inserted in the same manner into the openings at the end of the top piece, which are mirror images of the openings on the bottom piece. An alternative mechanism of attachment of the side pieces 24 to the top and bottom pieces comprises oppositely threaded screws placed at each end of the side pieces that may be screwed into the end of the top and bottom pieces.

Figure 7:
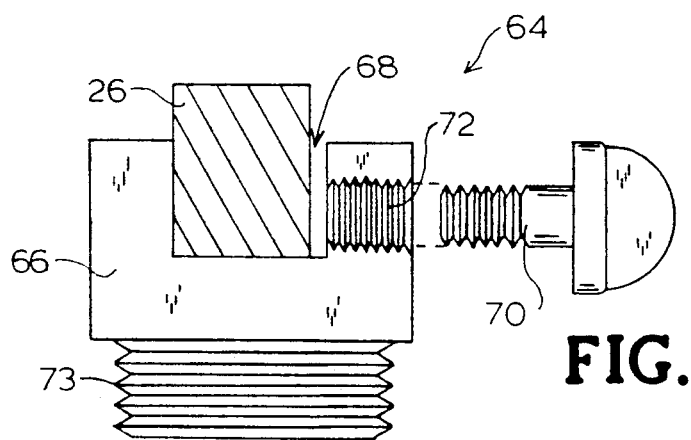
FIG. 7 is a side view of the thumbscrew fixture that holds the frame to the support.
Figure 8:
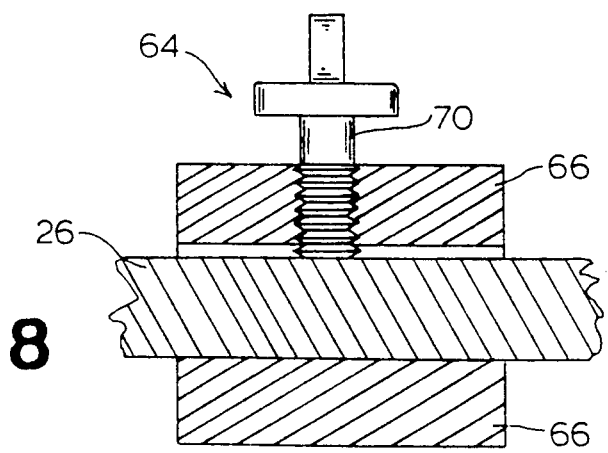
FIG. 8 is a top view of the thumbscrew fixture that holds the frame to the support.

The frame 22 is preferably connected to a support piece 62 by means of a thumbscrew fixture 64 (FIGS. 7–8). The thumbscrew fixture 64 comprises a block 66 having a linear groove 68 in the top of the block 66. The frame bottom piece 26 is placed in the linear groove 68 in the desired position, two of such possible positions A and B being depicted in FIG. 1. A thumbscrew 70 is then placed in an internally screw threaded hole 72 that extends from the exterior of the block 66 to the linear groove 68. Tightening of the screw 70 holds the bottom piece 26 of frame 22 in the linear groove 68 at the chosen position. To enable sterilization of thumbscrew fixture 64, it may be designed to screw into goose neck section 74 by screw mechanism 73 (FIG. 7) that threads into the end of gooseneck section 74. Thumbscrew fixture 64 may then be adjusted along bottom piece 26 without compromising sterility.

In the preferred embodiment, the support piece 62 comprises a goose neck section 74 adjacent the thumbscrew fixture 64 and a first straight tubular telescoping section 76 (FIG. 1). The first straight tubular telescoping section 76 is inserted into a second straight tubular telescoping section 78 that is attached to a base piece 80 and the first section 76 is held in the desired position within the second section 78 by means of a second thumbscrew 82. The thumbscrews 70 and 82 are preferably rounded to avoid tearing rubber gloves as shown in FIGS. 1, 7 and 8. The base piece 80 may comprise a heavy base for placement on a table surface or the floor and is preferably rounded for stability and safety. Alternatively, the base piece 80 may comprise a clamp for attachment to a chair arm or table edge or other protruding surface or a flat surface for attachment to a wall.

The goose neck piece 74 enables rotation and tilting of the frame 22 by appropriate adjustment of the goose neck section 74. The height of the frame above the floor or place of attachment is adjusted by relative movement of the first and second tubular sections with respect to each other.

Figure 10:
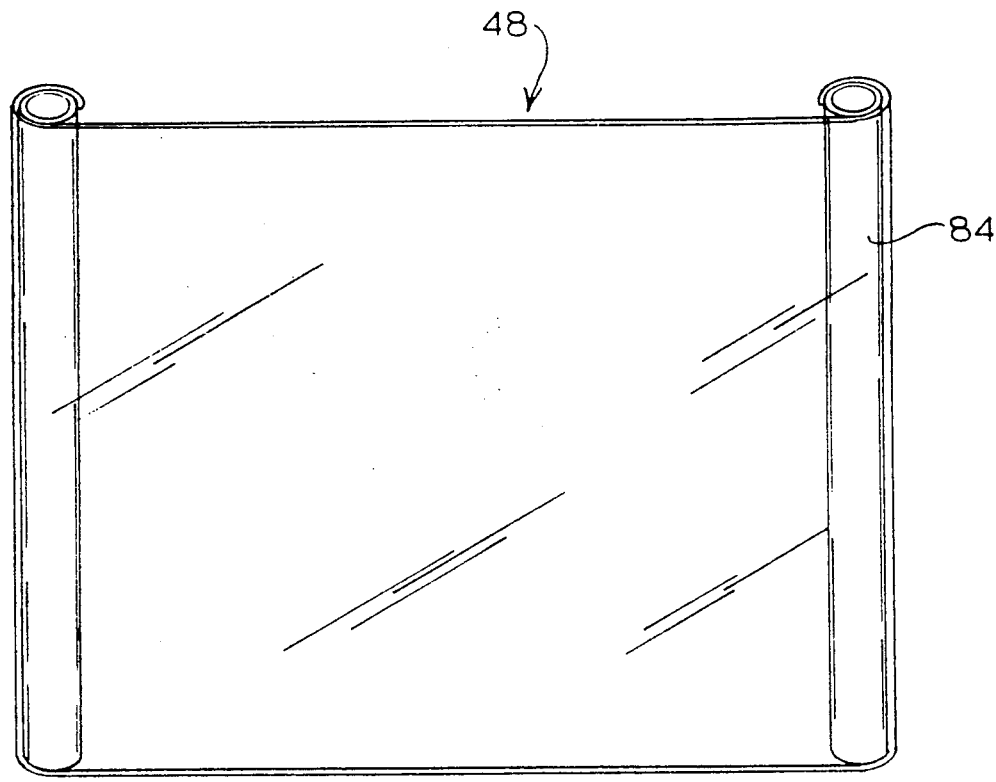
FIG. 10 is a perspective view of transparent wrap with sleeve ends.
Figure 11:
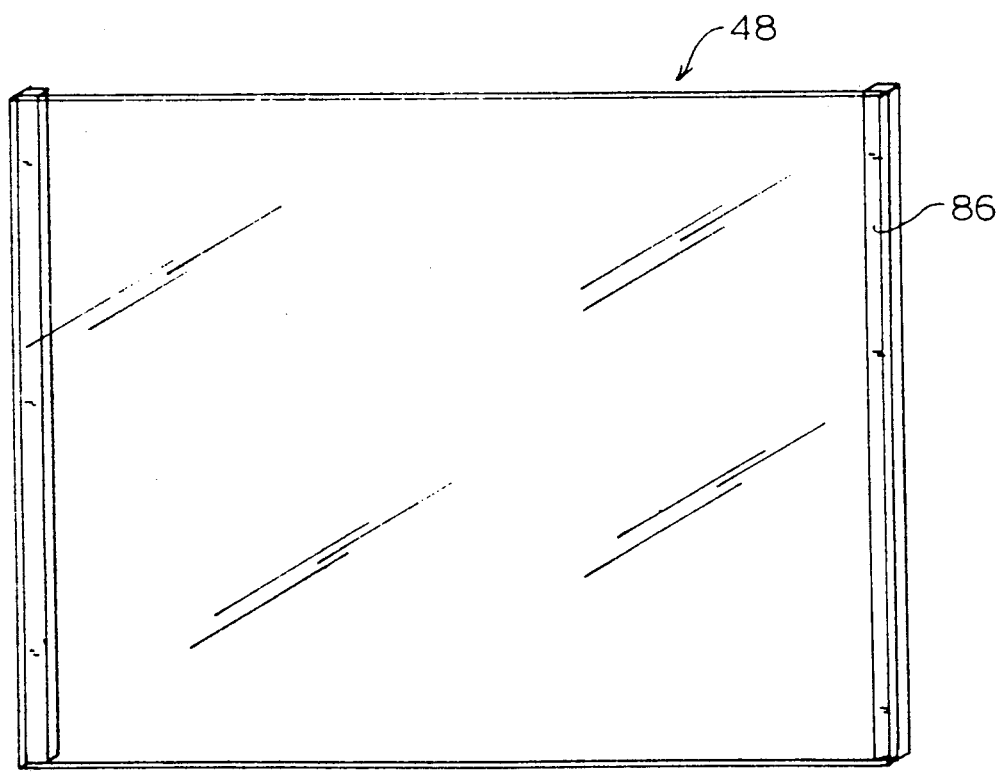
FIG. 11 is a perspective view of transparent wrap with strip ends.

The preferred shield material 48 is flexible transparent plastic wrap. A piece of this transparent material of a size to cover the area within the frame is paced across the assembled frame 22 with two opposite sides of the material pulled tightly across the side pieces 24. Preferably, the transparent material is placed across the side pieces 24 after the axially extending protrusions 30 at the ends of the side piece 24 are inserted into the top and bottom pieces. The hinged retention strips 34 are brought down and locked over the material, with the frictional piece 46 of rubber or other substance pressing the transparent material against the side piece. The pull of the transparent material holds the side pieces in their locked position. Alternatively or in addition to using the hinged pieces, a longer piece of transparent material may be used to wrap around the side pieces and back toward the center of the frame so that the self-cling nature of the transparent material helps to hold it on the frame. The transparent shields 48 may be manufactured individually with sleeves 84 at each end of the piece so that the sleeves may be slipped over the side pieces prior to insertion of the side pieces into the top and bottom pieces (FIG. 10). The individual pieces of film may also be made with the two ends of film fused to strips 86 of a material such as a hard plastic (FIG. 11). The sleeve 84 or strip 86 serves to provide an area at each end of the wrap to grip the sheet of wrap. Use of individual sheets of wrap eliminates measurement of sheet size in the medical or dental office or laboratory and also allows the individual shields to be presterilized.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A frame assembly for tensionally retaining a thin, flexible, resilient film, comprising:
   (a) a frame having four sides, said frame comprising:
   (i) opposedly positionable frame side members, each side member having axially extending protrusions at respective ends thereof, each said protrusion having a radially extending projection at its extremity, each said side member further including a longitudinally extending retention strip which is hingedly attached to said frame member at a first extremity thereof so as to be hingedly swingable to an open position, with closure means at a second end of the strip, and a complementary closure element on each said frame side member lockingly matable with the strip closure means; and
   (ii) opposedly positionable top and bottom frame members, each having openings at its respective ends for mating engagement with the protrusions of respective frame side members, such openings being configured so that the radial projections on said frame side members are secured against vertical movement by engagement of corresponding laterally extending passages in the openings, and when so engaged, the longitudinally extending retention strip is frontally disposed on the frame;

(b) a means to hold the film on the frame; and (c) a support structure for the frame, said support structure being positionally adjustable.

2. A frame assembly according to claim 1, wherein the support structure comprises:

(a) a flexible, non-extensible, goose neck-type support, joined at a firs end to the frame;

(b) a rigid first tubular section, joined at a first end thereof to a second end of said goose neck-type support;

(c) a rigid tubular second section telescopingly engageable at a first end thereof with the first tubular section;

(d) a base joined to a second end of said second tubular section; and (e) means for adjustably securing said first and second telescopingly engaged tubular sections in a selected fixed position relative to one another, whereby the height of the frame may be selectively adjusted.

3. A frame assembly according to claim 1, wherein the frame side, top and bottom members are formed of a steam-sterilizable and autoclavable material of construction.

4. A frame assembly according to claim 1, further comprising a flexible, resilient polymeric film tensionally retained on said frame by the longitudinally extending retention elements.

5. A frame according to claim 4, wherein the film is a cling-type film.

6. A frame assembly for tensionally retaining a thin, flexible, resilient film, comprising:

(a) a quadrilateral frame comprising opposedly positioned top and bottom frame members, and side frame members, the top and bottom frame members having openings at respective extremities thereof, said openings having a locking cavity, and the side frame members having protrusions at extremities thereof which are constructed and shaped to engage the openings at the top and bottom frame member extremities, wherein when a side piece is rotated, said protrusions at the ends of said side piece are lockingly matable with said openings by being rotated into said locking cavities;

(b) a means to hold the film on the frame; and (c) a support structure for the frame, said support structure comprising a base and a flexible and adjustably positionable support structure coupled at one end thereof to the base and secured at the other end thereof to the bottom frame member, such that the frame is manually positionable in a selected position relative to the base.

* * * * *